(12) United States Patent
Kim et al.

(10) Patent No.: US 12,009,540 B2
(45) Date of Patent: Jun. 11, 2024

(54) ECO-FRIENDLY POWER SOURCE SUCH AS BATTERY MODULE FOR TRANSPORTATION VEHICLE

(71) Applicant: SK On Co., Ltd., Seoul (KR)

(72) Inventors: Ho Yeon Kim, Daejeon (KR); Sang Tae An, Daejeon (KR); Hwa Kyoo Yoon, Daejeon (KR); Gang U Lee, Daejeon (KR); Young Sun Choi, Daejeon (KR); Jeong Woo Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/155,409

(22) Filed: Jan. 17, 2023

(65) Prior Publication Data

US 2024/0128572 A1 Apr. 18, 2024

(30) Foreign Application Priority Data

Oct. 13, 2022 (KR) .................. 10-2022-0131838
Oct. 28, 2022 (KR) .................. 10-2022-0141797

(51) Int. Cl.
| | |
|---|---|
| *H01M 50/291* | (2021.01) |
| *H01M 50/204* | (2021.01) |
| *H01M 50/249* | (2021.01) |
| *H01M 50/264* | (2021.01) |

(52) U.S. Cl.
CPC ....... *H01M 50/249* (2021.01); *H01M 50/204* (2021.01); *H01M 50/264* (2021.01); *H01M 50/291* (2021.01); *H01M 2220/20* (2013.01)

(58) Field of Classification Search
CPC . H01M 50/204; H01M 50/264; H01M 50/291
See application file for complete search history.

(56) References Cited

U.S. PATENT DOCUMENTS

| 2005/0285567 A1 | 12/2005 | Kim |
| 2015/0249239 A1 | 9/2015 | Ueda et al. |
| 2015/0340669 A1 | 11/2015 | Aoki |

(Continued)

FOREIGN PATENT DOCUMENTS

| CN | 114784431 A * | 7/2022 |
| EP | 0065349 A1 | 11/1982 |

(Continued)

OTHER PUBLICATIONS

Office Action for Korean Patent Application No. 10-2022-0141797 issued by the Korean Patent Office dated Aug. 1, 2023.

(Continued)

*Primary Examiner* — Jonathan G Jelsma
(74) *Attorney, Agent, or Firm* — IP & T GROUP LLP (57) ABSTRACT

An eco-friendly power source such as a battery module is provided for a transportation vehicle, including: a first sub-module and a second sub-module respectively including a cell stack in which a plurality of battery cells are stacked; and a central wall disposed between the first sub-module and the second sub-module, wherein the central wall includes a first central wall facing the first sub-module and a second central wall facing the second sub-module, wherein the first central wall has a rotationary symmetrical shape of the second central wall around a first axis.

14 Claims, 7 Drawing Sheets

(56) References Cited

U.S. PATENT DOCUMENTS

| | | |
|---|---|---|
| 2017/0054124 A1 | 2/2017 | Yoon |
| 2019/0198831 A1 | 6/2019 | Yuasa et al. |
| 2019/0267682 A1* | 8/2019 | Seo .................... H01M 10/613 |
| 2020/0006730 A1* | 1/2020 | Zacher ................ H01M 50/249 |
| 2020/0044213 A1 | 2/2020 | Park et al. |
| 2020/0127257 A1 | 4/2020 | Lee et al. |
| 2020/0127258 A1* | 4/2020 | Lim ..................... H01M 50/24 |
| 2021/0083245 A1* | 3/2021 | Yamazaki ........... H01M 50/242 |
| 2021/0104800 A1* | 4/2021 | Liao .................... H01M 10/613 |
| 2021/0313648 A1 | 10/2021 | Choi et al. |
| 2023/0170557 A1 | 6/2023 | Kim |
| 2023/0198077 A1 | 6/2023 | Kim et al. |

FOREIGN PATENT DOCUMENTS

| | | |
|---|---|---|
| EP | 3641004 A1 | 4/2020 |
| KR | 10-2017-0022783 A | 3/2017 |
| KR | 10-2019-0000210 A | 1/2019 |
| KR | 10-2020-0027709 A | 3/2020 |
| KR | 10-2021-0122592 A | 10/2021 |
| KR | 10-2307763 B1 | 10/2021 |
| KR | 10-2022-0026813 A | 3/2022 |
| KR | 10-2022-0106370 A | 7/2022 |
| WO | 2014/125605 A1 | 8/2014 |
| WO | 2022103212 A1 | 5/2022 |

OTHER PUBLICATIONS

Extended European Search Report for the European Patent Application No. 23164484.0 issued by the European Patent Office dated Sep. 19, 2023.

* cited by examiner

ECO-FRIENDLY POWER SOURCE SUCH AS BATTERY MODULE FOR TRANSPORTATION VEHICLE

CROSS-REFERENCE TO RELATED APPLICATION(S)

This application claims the benefit under 35 USC 119(a) of Korean Patent Application Nos. 10-2022-0131838 filed on Oct. 13, 2022 in the Korean Intellectual Property Office, and 10-2022-0141797 filed on Oct. 28, 2022 in the Korean Intellectual Property Office, the entire disclosures of which are incorporated herein by reference for all purposes.

BACKGROUND

The present disclosure relates to a battery module.

Conventionally, in the case of manufacturing a long module by disposing a plurality of sub-modules in which a cell stack and a busbar frame are coupled side by side in a longitudinal direction, each sub-module has been manufactured individually.

That is, after manufacturing one sub-module, another sub-module is manufactured separately. Thereafter, individually manufactured sub-modules are assembled and welded together side by side in a longitudinal direction and disposed inside a housing.

However, in accordance with such a conventional process, each sub-module is manufactured to have a different structure. Therefore, the overall process of manufacturing a battery module composed of a plurality of sub-modules has been complicated.

SUMMARY

Present disclosure provides a simplified process of manufacturing a battery module including a plurality of same sub-modules.

Present disclosure provides an eco-friendly power source, such as a battery module for a transportation vehicle in which a central wall is connected to a side cover to have improved mechanical rigidity.

Present disclosure provides an eco-friendly power source, such as a battery module for a transportation vehicle capable of preventing heat from propagating to adjacent sub-modules by coupling a sub-module and a central wall.

According to one embodiment of the present disclosure, an eco-friendly power source, such as a battery module for a transportation vehicle, comprises: a first sub-module and a second sub-module respectively including a cell stack in which a plurality of battery cells are stacked; and a central wall disposed between the first sub-module and the second sub-module, wherein the central wall includes a first central wall facing the first sub-module and a second central wall facing the second sub-module, wherein the first central wall has a rotationary symmetrical shape of the second central wall around a first axis.

In another embodiment of the present disclosure, the first central wall may be coupled to the first sub-module, and the second central wall may be coupled to the second sub-module.

In still another embodiment of the present disclosure, the first sub-module and the second sub-module may have the same structure.

In yet another embodiment of the present disclosure, the first central wall and the second central wall may have the same structure.

In one embodiment of the present disclosure, the eco-friendly power source, such as a battery module for a transportation vehicle may further include a side cover protecting the first sub-module, and the central wall may be coupled to the side cover.

In another embodiment of the present disclosure, the central wall may include a first fastening groove, and the central wall may be coupled to the side cover through a fastening member and the first fastening groove.

In still another embodiment of the present disclosure, the eco-friendly power source, such as a battery module for a transportation vehicle may further include an upper cover covering upper portions of the first sub-module and the second sub-module; and a lower cover covering lower portions of the first sub-module and the second sub-module, wherein the central wall may be coupled to the upper cover and the lower cover.

In yet another embodiment of the present disclosure, the central wall may include a second fastening groove, and the central wall may be coupled to the upper cover and the lower cover through a fastening member and the second fastening groove.

In a further embodiment of the present disclosure, the central wall may include a guide groove and a guide protrusion formed on one surface thereof.

In another embodiment of the present disclosure, the guide groove and the guide protrusion may be disposed to be symmetrical with respect to a centerline passing through a center of the central wall.

In one embodiment of the present disclosure, the guide groove of the first central wall may be in contact with the guide protrusion of the second central wall, and the guide protrusion of the first central wall may be in contact with the guide groove of the second central wall.

In still another embodiment of the present disclosure, the central wall may include a plurality of groove portions on one surface thereof.

The plurality of groove portions may expand inwardly from outer surface of the central wall to inner side of the center wall.

In a further embodiment of the present disclosure, the plurality of groove portions of the first central wall may extend in a first direction and have depth in a second direction perpendicular to the first direction and be formed in a direction, from the first central wall toward the first sub-module, and the plurality of groove portions of the second central wall may extend in the first direction and have depth in the second direction and be formed in a direction, from the second central wall toward the second sub-module.

According to another embodiment of the present disclosure, a battery module comprises: a plurality of sub-modules disposed side by side to each other, a central wall including a plurality of groove portions, the central wall being disposed between the plurality of sub-modules, and an upper cover and a lower cover, wherein each of the plurality of sub-modules includes a busbar assembly on a side surface facing a sequentially disposed sub-module, and wherein the busbar assembly electrically connects the plurality of sub-modules.

In another embodiment of the present disclosure, there is an empty space between a sub-module and the central wall.

According to another embodiment of the present disclosure, a battery module comprises: a first sub-module and a second sub-module respectively including a cell stack in which a plurality of battery cells are stacked; a central wall disposed between the first sub-module and the second submodule; and an upper cover and a lower cover covering the first sub-module and the second sub-module, wherein the central wall includes a first central wall facing the first sub-module and a second central wall facing the second sub-module, and wherein the first and second walls have through holes extending from the lower cover to the upper cover.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Prior to the detailed description of the present invention, the terms or words used in this specification and claims described below should not be construed as being limited to a common or dictionary meaning. Rather, inventors may be their own lexicographer to better describe their inventions. The terms and words used in this disclosure should be interpreted to have a meaning and concept corresponding to the technical idea of the present disclosure based on the principle that it may be properly defined as a concept of a term for explanation. Therefore, the embodiments described in this specification and the configurations shown in the drawings are only embodiments of the present disclosure, and do not represent all of the technical ideas of the present disclosure, so it should be understood that there may be various equivalents and modifications that can be substituted for the embodiments described in this disclosure.

In the following description, singular expressions include plural expressions unless the context clearly stated otherwise. The terms "comprise" or "include" are intended to indicate that there is a feature, number, step, operation, component, part, or combination thereof described in the specification, but "comprise" or "include" are not intended to preclude the presence or addition of one or more other features, numbers, steps, operations, components, parts, or combinations thereof. Therefore, "comprise" or "include" should be interpreted as non-exhaustive.

In addition, in the following description, expressions such as upper side, upper portion, lower side, lower portion, side surface, front surface, rear surface, and the like, are expressed based on a direction shown in the drawing, and if the direction of the object is changed, it is stated in advance that it may be expressed differently.

In addition, in the present specification and claims, terms including ordinal numbers such as "first" and "second" may be used to distinguish between elements. These ordinal numbers are used to distinguish the same or similar components from each other, and the meaning of the term should not be limitedly interpreted due to the use of these ordinal numbers. For example, elements combined with such ordinal numbers should not be construed as limiting an order of use or disposition by the number. If necessary, each ordinal number may be used interchangeably.

Hereinafter, embodiments of the present disclosure will be described with reference to the accompanying drawings. However, the scope of the present disclosure is not limited to the presented embodiments. For example, those skilled in the art understanding the scope of the present inventive concept could readily recognize other embodiments included in the scope of the present inventive concept through additions, alterations, deletions, or the like, of elements, but these will be also included within the scope of the present disclosure. The shapes and sizes of elements in the drawings may be exaggerated for clarity.

Figure 1:
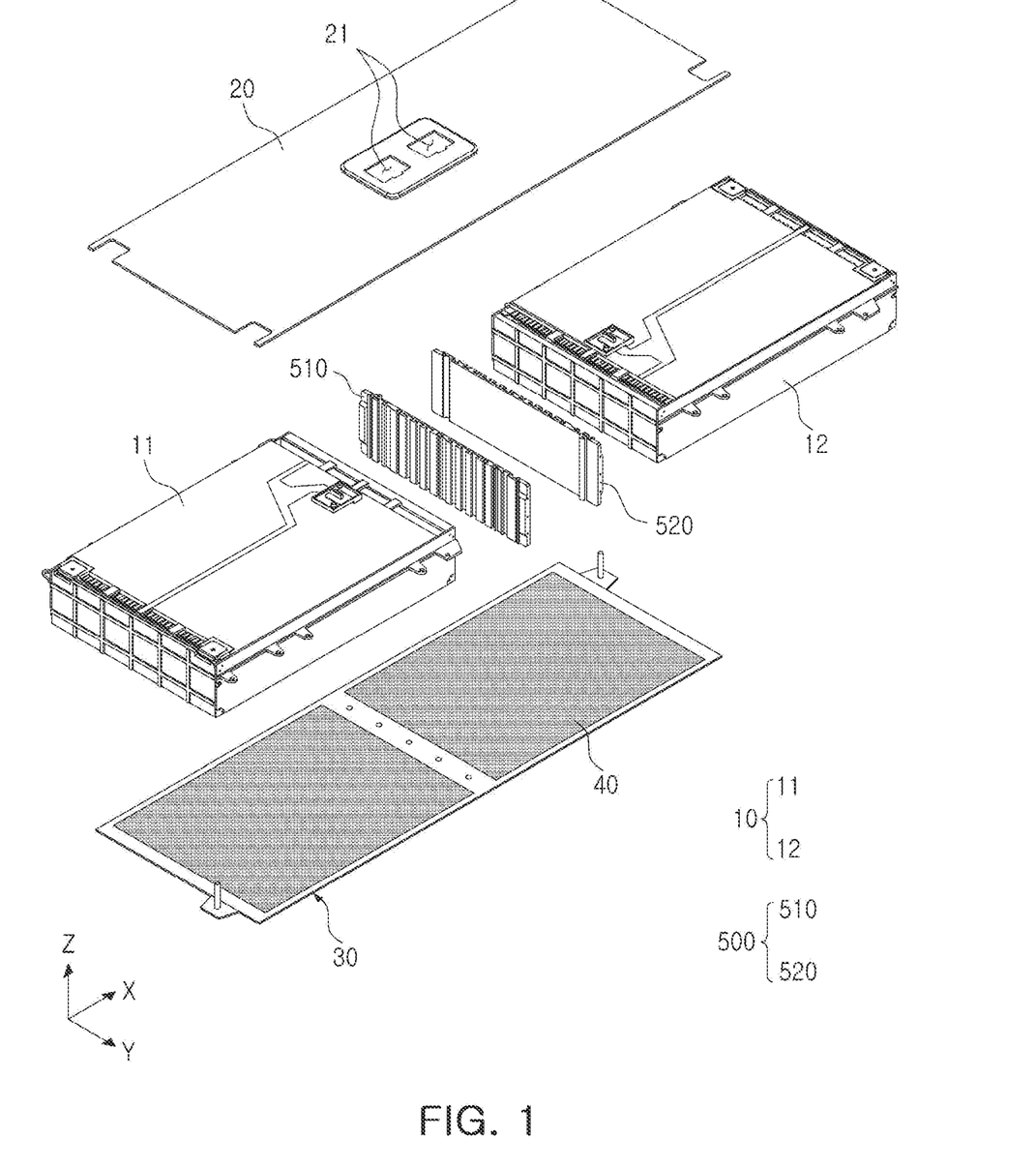
FIG. 1 is an exploded perspective view of a battery module according to one embodiment of the present disclosure.
Figure 2:
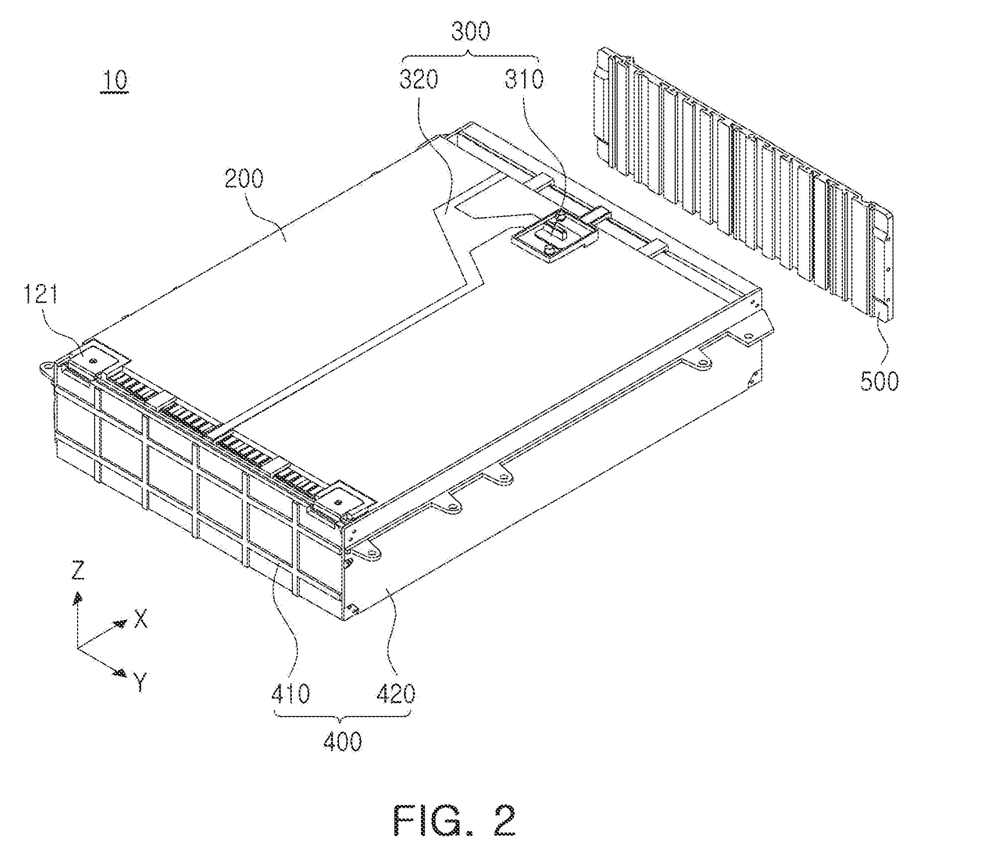
FIG. 2 is a perspective view of a sub-module according to another embodiment of the present disclosure.
Figure 3:
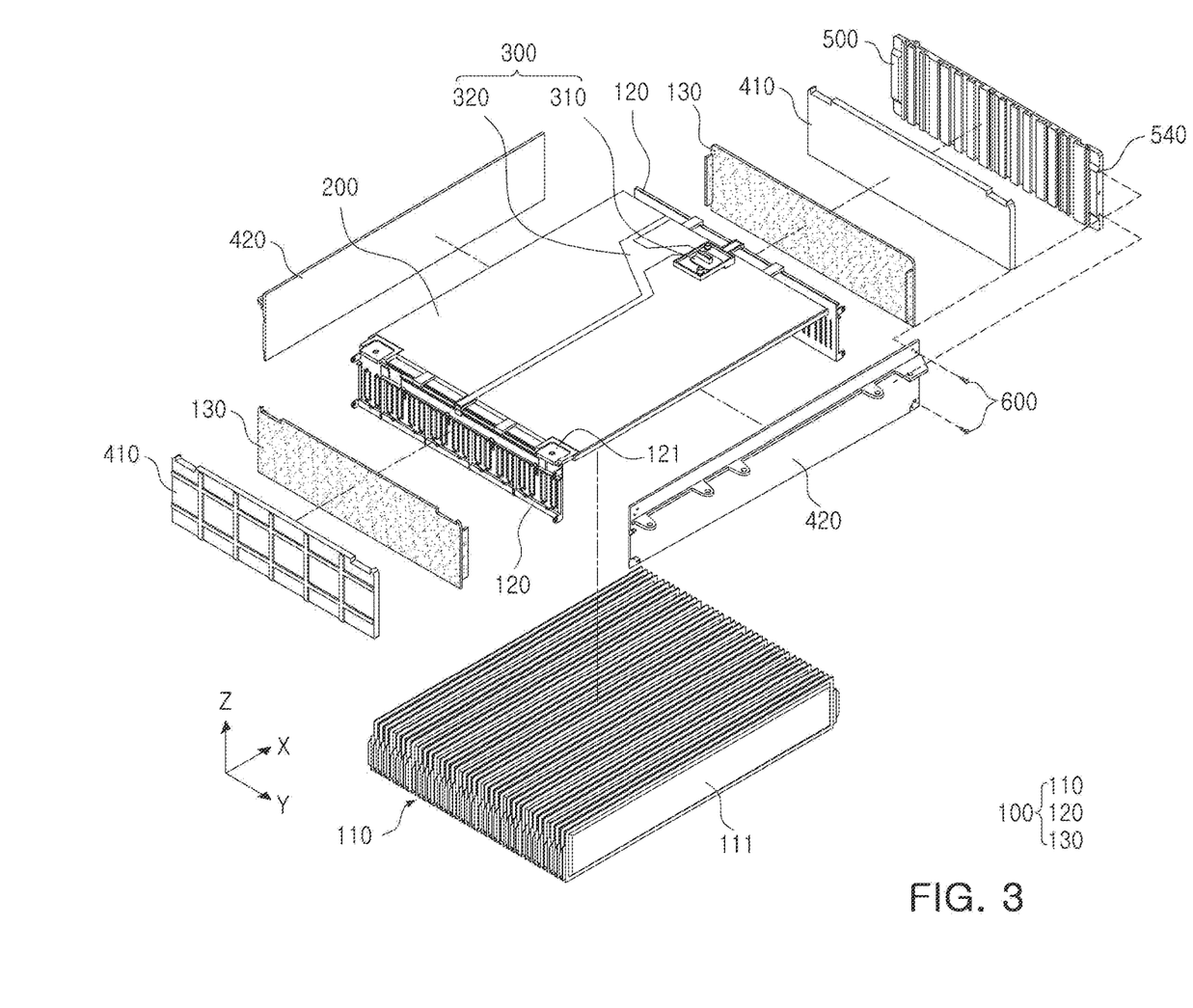
FIG. 3 is an exploded perspective view of the sub-module illustrate in FIG. 2.

FIG. 1 is an exploded perspective view of a battery module according to one embodiment of the present disclosure. FIG. 2 is a perspective view of a sub-module according to an embodiment of the present disclosure. FIG. 3 is an exploded perspective view of the sub-module illustrated in FIG. 2.

Referring to FIG. 1, a battery module 1 of the present disclosure may include a sub-module 10 including a central wall 500, and an upper cover 20 and a lower cover 30 covering the sub-module 10.

The sub-module 10 may include a first sub-module 11 and a second sub-module 12, and the first submodule 11 and the second submodule 12 may be disposed to face each other with the central wall 500 interposed therebetween. The first sub-module 11 and the second sub-module 12 may be formed to have the same structure. That is, the first sub-module 11 and the second sub-module 12 may include the same components (e.g., a cell assembly or a protective cover), and may be manufactured through the same manufacturing process. For example, the second sub-module 12 may be in a state in which the first sub-module 11 is rotated by 180° around a first direction (Z-direction), as an axis. That is, the first sub-module 11 and the second sub-module 12 may be disposed to be rotationally symmetrical around a first axis (Z-axis). The first sub-module 11 and the second sub-module 12 may be disposed to face each other in a second direction (X-direction), perpendicular to the first direction (Z-direction).

The first sub-module 11 may include a first central wall 510 and the second sub-module 12 may include a second central wall 520. The first central wall 510 and the second central wall 520 may be disposed between the first sub-module 11 and the second sub-module 12. The central wall 500 may block heat propagation between adjacent submodules 10.

The central wall 500 may include the first central wall 510 and the second central wall 520. The first central wall 510 and the second central wall 520 may be formed to have the same structure. That is, the first central wall 510 and the second central wall 520 may include the same components, and may be manufactured through the same manufacturing process. For example, a plurality of grooves may be formed on one surface of the first central wall 510 and the second central wall 520 in the same manner. Like the first and second sub-modules 11 and 12, the second central wall 520 may be in a state in which the first central wall 510 is rotated by 180° around the first direction (Z-direction), as an axis. That is, the first central wall 510 and the second central wall 520 may be disposed to be rotationally symmetrical around the first axis (Z-axis).

The battery module 1 may include an upper cover 20 disposed above the sub-module 10 and a lower cover 30 disposed below the sub-module 10. For example, the upper cover 20 may be disposed to cover upper surfaces of the first and second sub-modules 11 and 12, and the lower cover 30 may be disposed to cover lower surfaces of the first and second sub-modules 11 and 12.

The battery module 1 may include a housing covering the first and second sub-modules 11 and 12. For example, the housing may protect all of the upper portions, lower portions, and side surfaces of the first and second sub-modules 11 and 12. Although only an upper cover 20 and a lower cover 30 are illustrated in FIG. 1, the housing may additionally include a side cover to cover the first and second sub-modules 11 and 12.

The upper cover 20 may include an opening 21. As shown in FIG. 2, a sensing terminal 310 may be disposed on an outer surface of the upper cover 20 due to the opening 21. Therefore, even if the upper cover 20 covers the upper portions of the first and second sub-modules 11 and 12, the sensing terminal 310 may be exposed to an upper side thereof (e.g., in the Z-direction) through the opening 21 to be connected to an external circuit.

A heat conducting member may be disposed between the lower cover 30 and the first and second sub-modules 11 and 12. One surface of the heat conducting member may contact the sub-module 10 and the other surface may contact the lower cover 30. The heat conducting member may include a thermal adhesive.

A heat sink 40 may be disposed on the lower cover 30. A cooling passage may be formed in the heat sink 40. For example, one heat sink 40 may be formed to cover all of the first and second sub-modules 11 and 12. However, a structure of the heat sink 40 is not limited thereto. For example, a plurality of heat sinks 40 may be provided and configured to respectively correspond to the first and second sub-modules 11 and 12.

Referring to FIGS. 2 and 3, the sub-module 10 may include a cell assembly 100 in which a plurality of battery cells 111 are stacked in a third direction (Y-direction), and a protective cover 400 protecting the cell assembly 100 and a central wall 500. The protective cover 400 may protect the plurality of battery cells 111 from external impacts.

The cell assembly 100 may include a cell stack 110 including battery cells 111 stacked in a third direction (Y-direction), a busbar assembly 120 electrically connected to the cell stack 110, and an insulating cover 130 coupled to the busbar assembly 120.

The cell stack 110 may include one or more battery cells 111. The plurality of battery cells 111 included in the cell stack 110 may be pouch-type battery cells 111. The battery cell 111 may convert chemical energy into electrical energy to supply power to an external circuit or receive power from the outside to convert electrical energy into chemical energy and store the same therein. However, the battery cell 111 is not limited to a pouch-type battery cell. For example, the type of battery cell 111 may be a prismatic battery cell or a cylindrical battery cell.

The busbar assembly 120 may electrically connect the battery cells 111 accommodated in the cell assembly 100, and may include a terminal unit 121 connected externally.

For example, a plurality of busbar assemblies 120 may be disposed to be connected to the cell stack 110, and may be provided on both one side surface and the other side surface of the cell stack 110, facing each other. The busbar assembly 120 may be disposed on one side surface of the cell stack 110, and the terminal unit 121 may be connected to one side surface of an upper plate member 200. The terminal unit 121 may include a positive electrode terminal and a negative electrode terminal, and may be disposed to be spaced apart from each other.

The cell assembly 100 may include an insulating cover 130 coupled to the busbar assembly 120. The insulating cover 130 may be connected to the busbar assembly 120 and may block electrical connection between the busbar assembly 120 and an end cover 410.

The sub-module 10 may be connected to the cell assembly 100, and may include an upper plate member 200 disposed above the cell assembly 100. A sensing module 300 may be disposed on the upper plate member 200.

A sensing terminal 310 may be disposed on one side of the upper plate member 200 disposed on the central wall 500, and a terminal unit 121 may be connected to the other side of the upper plate member 200 on which the central wall 500 is not disposed.

The sensing module 300 may sense electrical and thermal states of the battery cells 111 included in the cell assembly 100. The sensing module 300 may be disposed above the cell assembly 100, and may be connected to a plurality of battery cells 111.

The sensing module 300 may include a sensing terminal 310 and a sensing circuit 320.

The sensing circuit 320 forms a circuit for sensing electrical and thermal states of the plurality of battery cells 111. For example, the sensing circuit 320 may be connected to the busbar assembly 120, and electrically connected to the battery cells 111.

The sensing terminal 310 may be connected to the sensing circuit 320 and may be connected externally. For example, in the battery module 1, the sensing terminal 310 may be connected to the upper cover 20. The sensing terminal 310 may be disposed on the other side surface of the upper plate member 200 facing one side surface of the upper plate member 200 to which the terminal unit 121 is connected.

The sub-module 10 may include a protective cover 400 coupled to the cell assembly 100.

The protective cover 400 may include a plurality of end covers 410 and a plurality of side covers 420 covering at least one side of the cell assembly 100. A lower portion of the cell assembly 100 may directly contact a heat sink 40 without being covered by the protective cover 400.

Accordingly, the cell assembly 100 directly contacts the heat sink 40 (shown in FIG. 1), so that the cooling efficiency of the battery module may be improved.

The end cover 410 may be disposed on a side on which the busbar assembly 120 is disposed in the sub-module 10, to cover the sub module 10. A plurality of end covers 410 may be provided, may be disposed on both sides thereof, and may be connected to the insulating cover 130. For example, an end cover 410, the insulating cover 130, the busbar assembly 120, and the cell stack 110 may be sequentially disposed on one side surface of the sub-module 10. That is, the end cover 410 may be disposed on both ends of the sub-module 10, and may protect the cell assembly 100 from external impacts or the external environment.

The side cover 420 may protect a side surface of the cell assembly 100. For example, the side cover 420 may be disposed on a side surface of the cell assembly 100, and may be disposed to face a cell body unit of the stacked battery cells 111.

The sub-module 10 may include a central wall 500 coupled to the cell assembly 100.

The central wall 500 may be disposed on a side of the sub-module 10 on which the sensing module 300 is disposed, to cover the sub module 10. For example, the central wall 500 may be provided on only one side of the sub-module, and may protect the cell assembly 100.

The central wall 500 may be coupled to the side cover 420. For example, the fastening member 600 may couple the central wall 500 and the side cover 420. Each of the central wall 500 and the side cover 420 may include a first fastening groove 540 corresponding to the fastening member 600. A plurality of first fastening grooves 540 may be provided.

The central wall 500 and the side cover 420 may be fixed by the fastening member(s) 600, and thus mechanical rigidity of the sub-module 10 may be improved, and structural stability may be obtained.

In the case of a conventional sub-module, a side cover was not fixed in a process of manufacturing the sub-module, and accordingly, the side cover was fixed and used by applying force from the outside. According to the battery module 1 of the embodiments of the present disclosure, since the side cover 420 and the central wall 500 are coupled so that the side cover 420 may be fixed, manufacturing process may be simplified.

In addition, in the case of a conventional battery module, the sub-modules included in the battery module have different structures, so that each of the sub-modules had to be individually manufactured. However, according to one embodiment of battery module 1, the same sub-module 10 may be repeatedly manufactured and connected. In addition, according to a central wall 500 to be described later, the central wall 500 having the same structure may be repeatedly manufactured and coupled to the sub-module 10. Accordingly, the battery module 1 may be produced by connecting the sub-module 10 connected to the central wall 500, and a manufacturing process of the battery module 1 may be simplified.

The central wall 500 may perform a function of blocking heat propagation between adjacent sub-modules 10. For example, heat generated in sub-module 10 may be prevented from propagating to adjacent sub-modules 10. For example, the central wall 500 may be formed of a member having low thermal conductivity. The flame retardant material (such as flame retardant plastic), ceramic coated metal, mica coated metal or flame retardant polymer coated metal can be used to form the central wall 500, but the present disclosure is not limited thereto. By disposing the central wall 500 having low thermal conductivity with the adjacent sub-modules 10 interposed therebetween, it is possible to reduce or prevent the heat emitted from the sub-modules 10 from being conducted to the adjacent sub-modules 10. In addition, as will be described later, a groove portion may be formed in the central wall 500, and thus a space may be formed inside the central wall 500. Accordingly, the internal space of the central wall 500 may perform a heat insulating function of blocking heat propagation.

Figure 4:
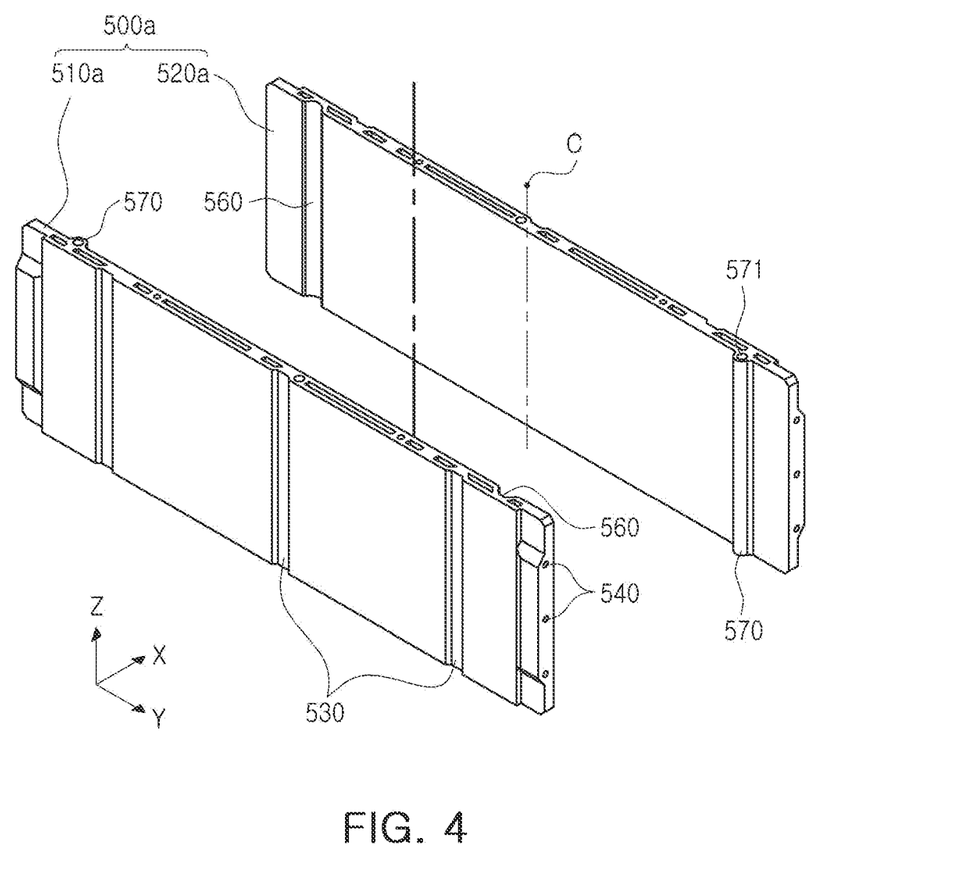
FIG. 4 is an exploded perspective view of a central wall according to another embodiment of the present disclosure.
Figure 5A:
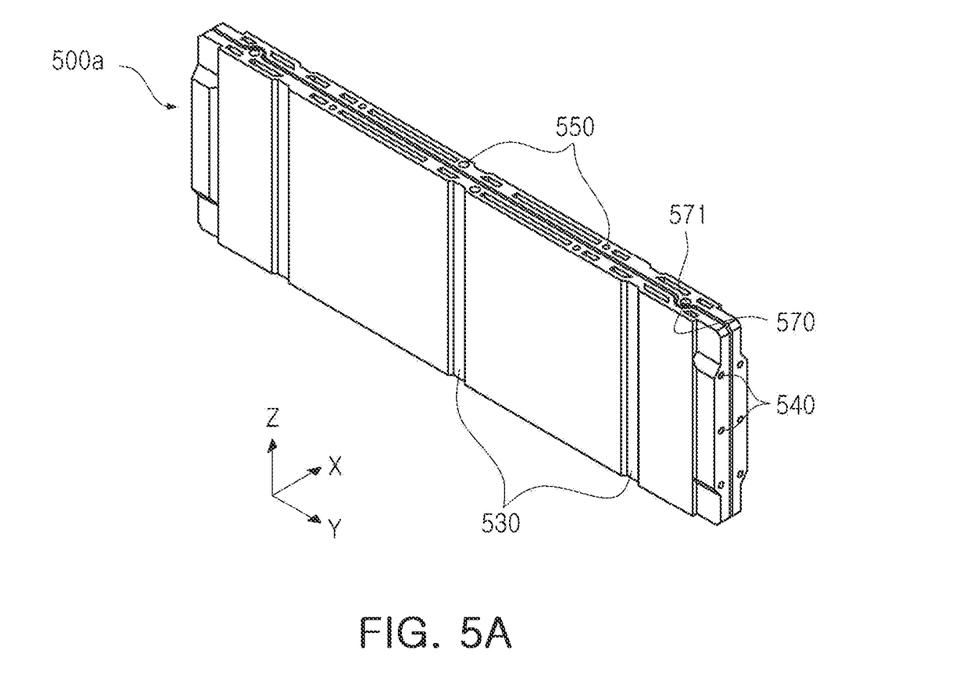
FIG. 5A is a perspective view illustrating a state in which the central wall illustrated in FIG. 4 is coupled.
Figure 5B:
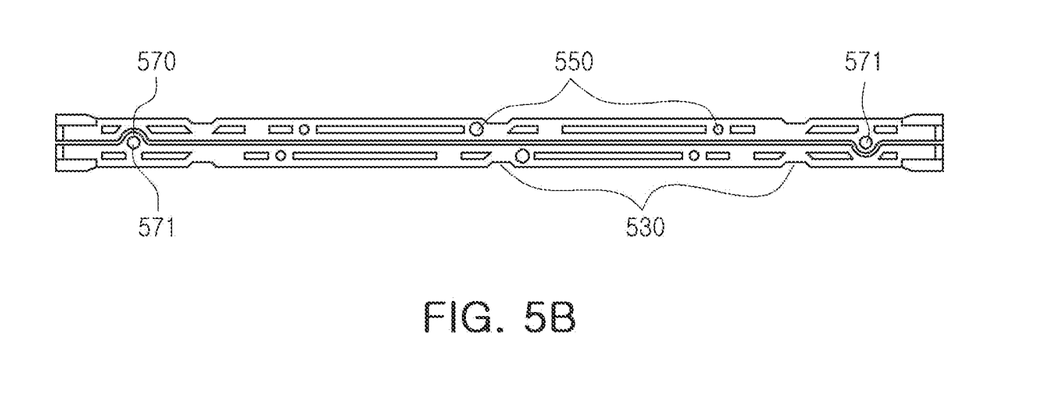
FIG. 5B is a plan view of the central wall illustrated in FIG. 5A.
Figure 6:
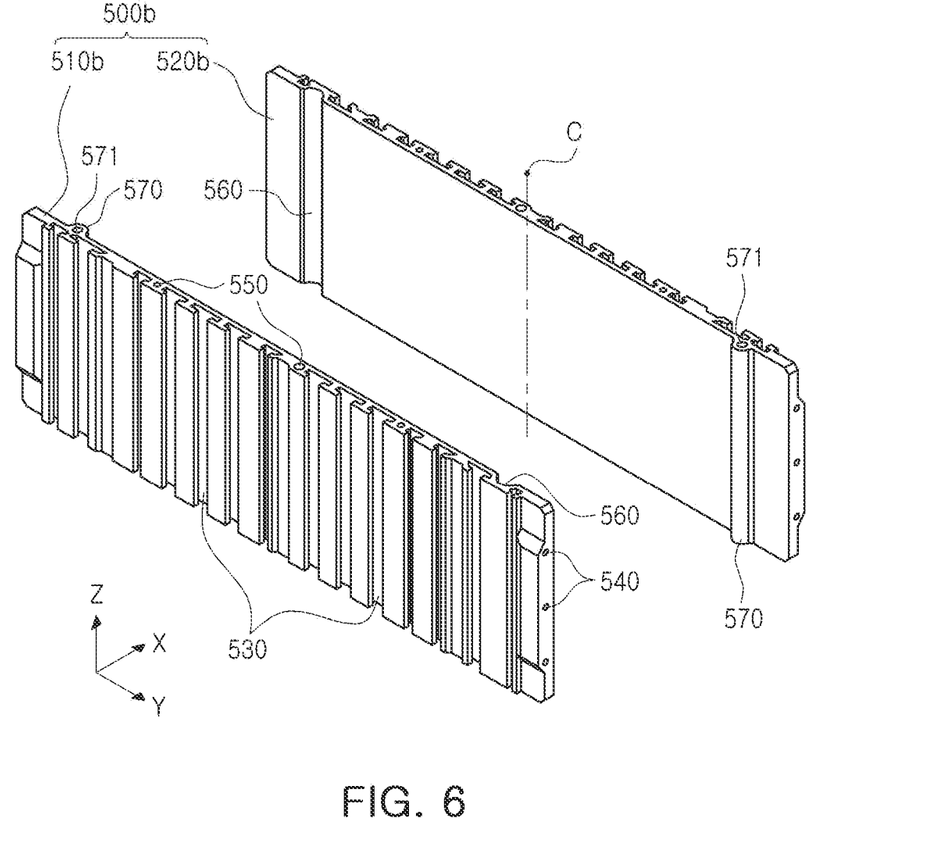
FIG. 6 is an exploded perspective view of a central wall according to still another embodiment of the present disclosure.
Figure 7A:
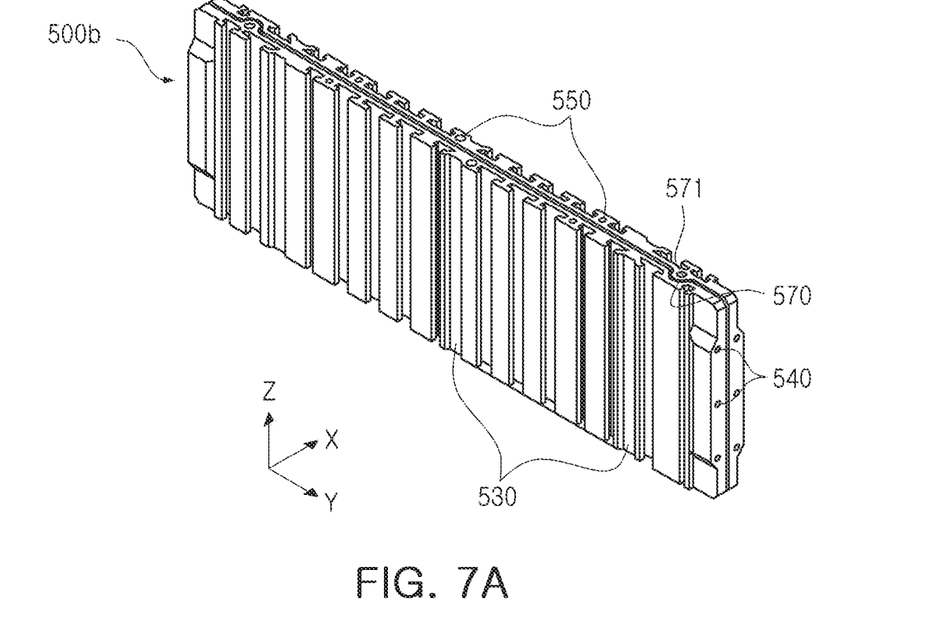
FIG. 7A is a perspective view illustrating a state in which the central wall illustrated in FIG. 6 is coupled.
Figure 7B:
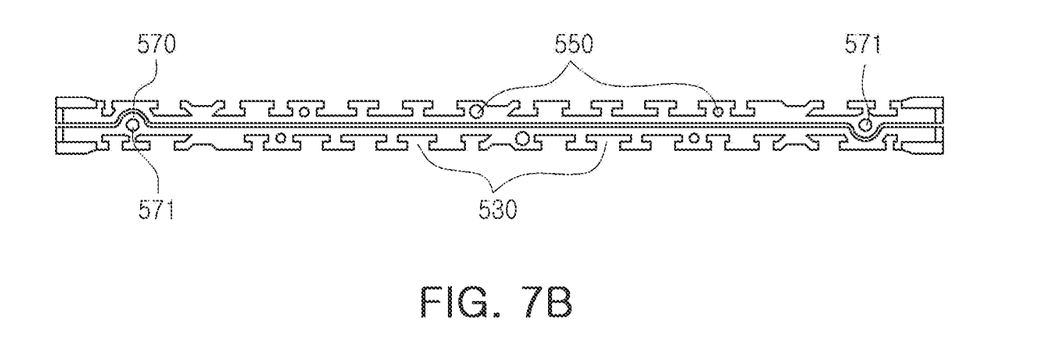
FIG. 7B is a plan view of the central wall illustrated in FIG. 7A.

FIG. 4 is an exploded perspective view of a central wall according to an embodiment of the present disclosure. FIG. 5A is a perspective view of the central wall illustrated in FIG. 4. FIG. 5B is a plan view of the central wall shown in FIG. 5A. FIG. 6 is an exploded perspective view of a central wall according to another embodiment of the present disclosure. FIG. 7A is a perspective view illustrating the central wall illustrated in FIG. 6. FIG. 7B is a plan view of the central wall illustrated in FIG. 7A.

Referring to FIGS. 4 to 7B, the central wall 500 according to embodiments of the present disclosure may be formed to have a length in a third direction (Y-direction). In addition, the central wall 500a (shown in FIG. 4) may include a plurality of groove portions 530, and may include a guide groove 560 and a guide protrusion 570 to be coupled to each other.

The central wall 500a may include a first central wall 510a and a second central wall 520a. The first central wall 510a may have the same structure as the second central wall 520a. For example, the first central wall 510a and the second central wall 520a may be rotated by 180° around a first axis. According to another embodiment of the present disclosure, the first central wall 510a and the second central wall 520a may be manufactured to be the same as each other and coupled to the sub-module 10 having the same structure, and a manufacturing process of the battery module 1 may be simplified.

As shown in FIG. 4, the first central wall 510a and the second central wall 520a may include a guide groove 560 and a guide protrusion 570 on one surface thereof, respectively. While the first central wall 510a and the second central wall 520a contact each other, one surface on which the guide groove 560 and the guide protrusion 570 are formed may be in contact with each other.

A guide protrusion 570 and a guide groove 560 may be formed on an opposite surface of the surface on which the groove portion 530 is formed. The guide groove 560 and the guide protrusion 570 may be formed to be symmetrical with respect to a centerline C in a longitudinal direction (e.g., the third direction (Y-direction)) of the center wall 500a. Therefore, when the first central wall 510a and the second central wall 520a are coupled, the guide groove 560 of the first central wall 510 and the guide protrusion 570 of the second central wall 520 may be in contact with each other, the guide protrusion 570 of the first central wall 510a and the guide groove 560 of the second central wall 520a may be in contact with each other. The guide protrusion 570 and the guide groove 560 may correspond to each other, and in the battery module 1, the first central wall 510a and the second central wall 520a may be in close contact with each other. Therefore, since a space between the central walls 510a and 520a does not exist, a space-saving efficiency in the battery module 1 may be secured.

The guide protrusion 570 may include a through-hole 571. The through-hole 571 may be formed to have a length in the first direction (Z-direction). As the through-hole 571 is formed, an empty space may be formed inside the guide protrusion 570. Thus, an empty space may be formed inside the central wall 500, and a weight of the battery module 1 including the central wall 500 may be reduced.

FIGS. 4, 5A and 5B illustrate a central wall 500a according to one embodiment of the present disclosure.

The central wall 500a according to this embodiment of the present disclosure may include a plurality of groove portions 530 on one surface thereof. A plurality of groove portions 530 may be formed on one surface of the central wall 510a or 520a. For example, the plurality of groove portions 530 may be formed to have a length in a first direction (Z-direction). Referring to FIG. 3, one surface of the central wall 500a on which the plurality of groove portions 530 are formed may be disposed in a direction facing the sub-module 10. Referring to FIG. 1, the groove portion 530 of the first central wall 510a may extend in the first direction (Z-direction) and have depth in the second direction (X-direction) direction and be formed in a direction from the first central wall 510a toward the first sub-module 11, and the groove portion 530 of the second central wall 520a may extend in the first direction (Z-direction) and have depth in the second direction (X-direction) be formed in a direction from the second central wall 520a toward the second sub-module 12. Heat or gas may be generated in battery cells 111 of the sub-module 10, and the heat or gas may propagate to the central wall 500a. In this case, the groove portion 530 of the central wall 500a may function similarly to a vent hole, and the heat or gas emitted from the sub-module 10 may move in the groove portion 530 to both ends thereof in the first direction (Z-direction). The heat propagated to both ends thereof in the first direction (Z-direction) may move to a heat sink 40 disposed below a lower cover 30 and be cooled.

The central wall 500a according to another embodiment of the present disclosure may include a first fastening groove 540 to be coupled to the side cover 420. That is, the central wall 500a may be connected to the side cover 420, and a fastening member 600 may be coupled to the first fastening groove 540. Thus, the side cover 420 may be fixed without applying external force to fix the side cover 420. The first fastening groove 540 may be formed on a side surface, adjacent to one side surface on which the groove portion 530 is formed. For example, the first fastening groove 540 may be formed to have a length in a third direction (Y-direction).

The central wall 500a may include a second fastening groove 550 to be coupled to an upper cover 20 and a lower cover 30. The second fastening groove 550 may be connected to the upper cover 20 and the lower cover 30 and may be fastened through the fastening member 600. Therefore, in the battery module 1 according to one embodiment of the present disclosure, the upper cover 20 and the lower cover 30 may be fixed by being coupled to the central wall 500a. The second fastening groove 550 may be formed on a side surface, adjacent to one side surface on which the groove portion 530 is formed, and may be formed on a side, other than the side on which the first fastening groove 540 is formed. For example, the second fastening groove 550 may be formed to have a length in the first direction (Z-direction). Referring to FIG. 5B, a plurality of second fastening grooves 550 may be provided.

FIGS. 6, 7A and 7B illustrate a central wall 500b according to another embodiment of the present disclosure.

In a central wall 500b, a groove portion 530 may be formed in a structure in which the groove portion 530 expands inwardly from outer surface of the central wall 500b to inner side of the central wall 500b. As the groove portion 530 there inside extends, heat or gas that has moved to the central wall 500b may be easily accommodated in the groove portion 530. Accordingly, the accommodated heat or gas can move along the groove portion 530 in a first direction (Z-direction).

In the central wall 500b, the groove portion 530 may be expanded so that an empty space may be additionally formed inside the central wall 500b. Accordingly, a weight of the central wall 500b may be reduced, and a weight of the battery module 1 including the central wall 500b may be reduced.

The central wall 500b may include a first fastening groove 540 and a second fastening groove 550, like the central wall 500a of the earlier embodiment of the present disclosure, and may include a guide protrusion 570 and a guide groove 560. The guide protrusion 570 and the guide groove 560 of the central wall 500b may be formed to be symmetrical with respect to a centerline C of the central wall 500 in a longitudinal direction (e.g., third direction (Y-direction).

As set forth above, in at least some embodiments of the present disclosure, a manufacturing process may be simplified by including the same sub-module.

In at least some embodiments of the present disclosure, a central wall may be connected to a side cover to improve mechanical rigidity.

In at least some embodiments of the present disclosure, a sub-module and a central wall may be coupled to prevent heat from propagating to an adjacent sub-module.

While this disclosure includes specific examples, it will be apparent to a person of ordinary skill in the art that various changes in form and details may be made without departing from the spirit and scope of the claims and their equivalents. The embodiments described herein are to be considered in a descriptive sense only, and not for purposes of limitation. Descriptions of features or aspects in each embodiment are to be considered as being applicable to similar features or aspects in other examples. Therefore, the scope of the disclosure is defined not by the detailed description, but by the claims and their equivalents, and all variations within the scope of the claims and their equivalents are to be construed as being included in the disclosure.

For example, the above-described embodiments will fall within the scope of the present disclosure even when some components are not included. Furthermore, each embodiment may be implemented in combination with each other.

What is claimed is:

1. An eco-friendly battery module, comprising:
   a first sub-module and a second sub-module respectively including a cell stack in which a plurality of battery cells are stacked; and
   a central wall disposed between the first sub-module and the second sub-module,
   wherein the central wall includes a first central wall contacting the first sub-module and a second central wall contacting the second sub-module,
   wherein the first central wall comprises at least one first groove portion disposed on a surface of the first central wall, but not completely penetrating through the first central wall, the at least one first groove portion on the surface of the first central wall contacting the first sub-module,
   wherein the second central wall comprises at least one second groove portion disposed on a surface of the second central wall, but not completely penetrating through the second central wall, the at least one second groove portion on the surface of the second central wall contacting the second sub-module, and
   wherein the at least one first groove portion and the at least one second groove portion have a space to move gas emitted from the battery.

2. The eco-friendly battery module of claim 1, wherein the first central wall is coupled to the first sub-module, wherein the second central wall is coupled to the second sub-module.

3. The eco-friendly battery module of claim 1, wherein the first sub-module and the second sub-module have the same structure.

4. The eco-friendly battery module of claim 3, wherein the first central wall and the second central wall have the same structure.

5. The eco-friendly battery module of claim 1, further comprising:
   at least one side cover protecting at least one of the first sub-module and the second sub-module, wherein the central wall is coupled to the at least one side cover.

6. The eco-friendly battery module of claim 5, wherein the central wall comprises a first fastening groove,
wherein the central wall is coupled to the at least one side cover through a fastening member and the first fastening groove.

7. The eco-friendly battery module of claim 1, further comprising:
an upper cover covering upper portions of the first sub-module and the second sub-module; and
a lower cover covering lower portions of the first sub-module and the second sub-module,
wherein the central wall is coupled to the upper cover and the lower cover.

8. The eco-friendly battery module of claim 7, wherein the central wall comprises a second fastening groove,
wherein the central wall is coupled to the upper cover and the lower cover through a fastening member and the second fastening groove.

9. The eco-friendly battery module of claim 1, wherein the central wall comprises a guide groove and a guide protrusion formed on one surface thereof.

10. The eco-friendly battery module of claim 9, wherein the guide groove and the guide protrusion are disposed to be symmetrical with respect to a centerline passing through a center of the central wall.

11. The eco-friendly battery module of claim 9, wherein the guide groove of the first central wall is in contact with the guide protrusion of the second central wall,
wherein the guide protrusion of the first central wall is in contact with the guide groove of the second central wall.

12. The eco-friendly battery module of claim 1,
wherein the at least one first groove portion expands inwardly from outer surface of the first central wall to inner side of the first central wall, and
wherein the at least one second groove portion expand inwardly from outer surface of the second central wall to inner side of the second central wall.

13. The eco-friendly battery module of claim 1, wherein the at least one first groove portion of the first central wall extends in a first direction and has a depth in a second direction perpendicular to the first direction and is formed in a direction, from the first central wall toward the first sub-module,
wherein the at least one second groove portion of the second central wall extends in the first direction and has depth in the second direction and is formed in a direction, from the second central wall toward the second sub-module.

14. A battery module comprising:
a first sub-module and a second sub-module respectively including a cell stack in which a plurality of battery cells are stacked;
a central wall disposed between the first sub-module and the second sub-module; and
an upper cover and a lower cover covering the first sub-module and the second sub-module,
wherein the central wall includes a first central wall facing the first sub-module and a second central wall facing the second sub-module,
wherein the first central wall and the second central wall have through holes extending from the lower cover to the upper cover,
wherein the first central wall comprises at least one first groove portion disposed on a surface of the first central wall, but not completely penetrating through the first central wall, the at least one first groove portion on the surface of the first central wall contacting the first sub-module,
wherein the second central wall comprises at least one second groove portion disposed on a surface of the second central wall, but not completely penetration through the second central wall, the at least one second groove portion on the surface of the second central wall contacting the second sub-module, and
wherein the at least one first groove portion and the at least one second groove portion have a space to move gas emitted from the battery cells.

* * * * *